(12) United States Patent
Minamikawa

(10) Patent No.: US 12,287,451 B2
(45) Date of Patent: Apr. 29, 2025

(54) OPTICAL STRUCTURE, TRANSFER FOIL, ARTICLE, AND METHOD OF PRODUCING OPTICAL STRUCTURE

(71) Applicant: TOPPAN PRINTING CO., LTD., Tokyo (JP)

(72) Inventor: Naoki Minamikawa, Tokyo (JP)

(73) Assignee: TOPPAN PRINTING CO., LTD., Tokyo (JP)

(*) Notice: Subject to any disclaimer, the term of this patent is extended or adjusted under 35 U.S.C. 154(b) by 715 days.

(21) Appl. No.: 17/493,167

(22) Filed: Oct. 4, 2021

(65) Prior Publication Data

US 2022/0026602 A1  Jan. 27, 2022

Related U.S. Application Data

(63) Continuation of application No. PCT/JP2020/015964, filed on Apr. 9, 2020.

(30) Foreign Application Priority Data

Apr. 9, 2019  (JP) ................................. 2019-073860

(51) Int. Cl.
 *B42D 25/328* (2014.01)
 *B29C 43/46* (2006.01)
 *B42D 25/23* (2014.01)
 *B42D 25/47* (2014.01)
 (Continued)

(52) U.S. Cl.
 CPC ................ *G02B 1/10* (2013.01); *B29C 43/46* (2013.01); *B42D 25/23* (2014.10); *B42D 25/328* (2014.10); *B42D 25/47* (2014.10); *G02B 1/04* (2013.01); *B29C 2043/463* (2013.01)

(58) Field of Classification Search
 CPC .... B29C 2035/0822; B29C 2035/0827; B29C 2035/0805; B42D 25/328; B42D 25/47
 See application file for complete search history.

(56) References Cited

U.S. PATENT DOCUMENTS

| 2003/0058491 A1 | 3/2003 | Holmes et al. |
| 2007/0273142 A1 | 11/2007 | Tompkin et al. |
| 2008/0152875 A1 | 6/2008 | Tomita et al. |

(Continued)

FOREIGN PATENT DOCUMENTS

| DE | 10 2005 017 169 A1 | 10/2006 |
| DE | 10 2006 032 679 A1 | 1/2008 |

(Continued)

OTHER PUBLICATIONS

KR20160064707A English Translatoin (Year: 2016).*
(Continued)

*Primary Examiner* — Kyle R Grabowski
(74) *Attorney, Agent, or Firm* — Foley & Lardner LLP

(57) ABSTRACT

An optical structure includes a multilayer relief that has a first surface having an uneven shape, and a reflection layer that is formed on the first surface and reflects visible light. The multilayer relief includes a first resin layer that contains a non-radiation curable resin as a main component and constitutes the first surface, and a second resin layer that contains a radiation curable resin as a main component and is adjacent to the first resin layer. The first resin layer has a thickness smaller than an unevenness difference of the uneven shape.

1 Claim, 4 Drawing Sheets

(51) Int. Cl.
*G02B 1/04* (2006.01)
*G02B 1/10* (2015.01)

(56) References Cited

U.S. PATENT DOCUMENTS

| | | | |
|---|---|---|---|
| 2008/0239216 A1* | 10/2008 | Miyamoto | B42D 25/328 349/113 |
| 2009/0061159 A1 | 3/2009 | Staub et al. | |
| 2012/0064303 A1* | 3/2012 | Yashiki | G02B 5/32 427/162 |
| 2018/0154605 A1 | 6/2018 | Yashiki | |
| 2018/0361776 A1* | 12/2018 | Nigatu | B42D 25/29 |
| 2019/0232612 A1 | 8/2019 | Minamikawa | |

FOREIGN PATENT DOCUMENTS

| | | | | |
|---|---|---|---|---|
| EP | 1879154 A2 * | 1/2008 | | B42D 25/324 |
| EP | 2 390 106 A2 | 11/2011 | | |
| EP | 2 717 102 A1 | 4/2014 | | |
| EP | 2 974 879 A1 | 1/2016 | | |
| EP | 3 306 362 A1 | 4/2018 | | |
| ES | 2519890 T3 * | 11/2014 | | B42D 25/328 |
| JP | 2524092 Y2 | 1/1997 | | |
| JP | 2003-326824 A | 11/2003 | | |
| JP | 4088884 B | 5/2008 | | |
| JP | 4194073 B2 | 12/2008 | | |
| JP | 2010048879 A * | 3/2010 | | |
| JP | 2010-256595 A | 11/2010 | | |
| JP | 2010-269480 A | 12/2010 | | |
| KR | 20160064707 A * | 6/2016 | | |
| WO | WO-9615912 A2 * | 5/1996 | | B29C 41/20 |
| WO | WO-2006/095902 A1 | 9/2006 | | |
| WO | WO-2005/095119 A1 | 10/2015 | | |
| WO | WO-2017/182792 A1 | 10/2017 | | |
| WO | WO-2018/070484 A1 | 4/2018 | | |

OTHER PUBLICATIONS

Office Action issued in corresponding European Patent Application No. 20787696.2, dated Feb. 22, 2023.
International Searching Authority, "International Search Report," issued in connection with International Patent Application No. PCT/JP2020/015964, dated Apr. 9, 2020.
International Searching Authority, "Written Opinion," issued in connection with International Patent Application No. PCT/JP2020/015964, dated Apr. 9, 2020.
Office Action issued in corresponding Japanese Patent Application No. 2021-513699 dated Apr. 2, 2024 (7 pages).
Epoxy Set Inc., Technical Bulletin, "Epoxibond EB-220 High Strength, Flexible Epoxy Adhesive," retrieved from the internet: https://urldefense.com/v3/_http://www.epoxy-set.com_;!!L2Ps738!yhiDRozdpCFRJil112qKqZ-NR-O0f-X3SA8knGF7QGBEUmrOueltCDH8pVu55CUB2yevtbR9NN97r--cXGp_QO_Fsvzf$.
European Notice of Opposition issued in corresponding European Patent Application No. 20787696.2 dated Jan. 28, 2025.
Geyer, Fehners & Partner, "Merkmalsgliederung", Anlage D7.

* cited by examiner

OPTICAL STRUCTURE, TRANSFER FOIL, ARTICLE, AND METHOD OF PRODUCING OPTICAL STRUCTURE

CROSS-REFERENCE TO RELATED PATENT APPLICATIONS

This application is a continuation application filed under 35 U.S.C. § 111(a) claiming the benefit under 35 U.S.C. §§ 120 and 365(c) of International Patent Application No. PCT/JP2020/015964, filed on Apr. 9, 2020, which is based upon and claims the benefit of priority to Japanese Patent Application No. 2019-073860, filed on Apr. 9, 2019; the disclosures of which are incorporated herein by reference in their entireties.

TECHNICAL FIELD

Embodiments of the present invention relate to an optical structure including an optical relief, and a method of producing the optical structure. Furthermore, reference will also be made to a transfer foil and an article including the optical structure.

BACKGROUND

Optical reliefs are composed of a periodic or random uneven structure of micrometer to nanometer size. Optical reliefs are used as various optical structures such as relief holograms, diffraction gratings, subwavelength gratings, microlenses, polarization elements, Fresnel lens plates and lenticular plates used for screens and the like, optical disks, and backlight-related components, diffusion plates, and anti-reflection coatings of liquid crystal devices.

Optical reliefs are also used as elements for confirming authenticity. Identification articles and valuables including an optical relief can significantly enhance an effect of preventing counterfeiting and tampering, and improve the value of the articles themselves.

Known typical methods for continuously duplicating a large number of optical reliefs include a "pressing method" (see Patent Literature 1), a "casting method" (see Patent Literature 2), and a "photopolymerization method" (see Patent Literature 3).

The photopolymerization method is also referred to as a 2P method or a photosensitive resin method. In the photopolymerization method, a radiation curable resin to be cured by irradiation with radiation in a broad sense, such as ultraviolet light (UV) or electron beams (EB), is poured into the space between an optical relief duplication mold and a flat substrate such as a plastic film, and the radiation curable resin is cured by irradiation to obtain a cured film. By peeling off the cured film together with the substrate from the duplication mold, a large number of optical reliefs with high definition can be continuously duplicated. The photopolymerization method allows an uneven shape constituting the optical relief to have high molding accuracy and exhibit good heat resistance and chemical resistance as compared with the pressing method or the casting method using a thermoplastic resin.

[Citation List] [Patent Literature] [PTL 1] JP 4194073 B; [PTL 2] JP 2524092 U; [PTL 3] JP 4088884 B

SUMMARY OF THE INVENTION

Technical Problem

While having advantages such as high molding accuracy and good heat resistance, an optical relief produced by the photopolymerization method using a radiation curable resin has a disadvantage in that the optical relief has poor adhesion to a reflection layer in contact with the optical relief. One of the reasons may be volume contraction during curing of the radiation curable resin. Radiation curable resins undergo larger volume contraction during curing than non-radiation curable resins. Thus, presumably, a distortion stress remains at an interface between the radiation curable resin and the reflection layer, and this tends to cause adhesion failure starting from the point to which the distortion stress is applied.

In view of the above circumstances, an object of the present invention is to provide an optical structure having high molding accuracy and good heat resistance and exhibiting good adhesion between an optical relief and a reflection layer, and a method of producing the optical structure.

Solution to Problem

A first aspect of the present invention is an optical structure including a multilayer relief that has a first surface having an uneven shape, and a reflection layer that is formed on the first surface and reflects visible light.

The multilayer relief includes a first resin layer that contains a non-radiation curable resin as a main component and constitutes the first surface, and a second resin layer that contains a radiation curable resin as a main component and is adjacent to the first resin layer.

The first resin layer has a thickness smaller than an unevenness difference of the uneven shape.

A second aspect of the present invention is a transfer foil including the optical structure of the present invention.

A third aspect of the present invention is an article including the optical structure of the present invention.

A fourth aspect of the present invention is a method of producing an optical structure, the method including a step A of forming, in this order, on a carrier, a precursor layer made of a radiation curable resin, and a first resin layer containing a non-radiation curable resin as a main component, a step B of pressing, against the first resin layer, an embossing cylinder that has a surface shape having an unevenness difference larger than a thickness of the first resin layer, and transferring the surface shape to the first resin layer and the precursor layer, a step C of curing the precursor layer by radiation exposure to form a second resin layer, and a step D of forming a reflection layer on the first resin layer.

Advantageous Effects of the Invention

An optical structure of the present invention has high molding accuracy and good heat resistance and exhibits good adhesion between an optical relief and a reflection layer.

DETAILED DESCRIPTION

Embodiments of the present invention of will be described below with reference to the drawings.

A first embodiment of the present invention will be described below with reference to FIGS. 1 to 4. The embodiments of the present invention are a group of embodiments based on a single unique invention from the background. The aspects of the present invention are those of the group of embodiments based on a single invention. Configurations of the present invention can have the aspects of the present invention. Features of the present invention can be combined to form the configurations. Therefore, the features, configurations, aspects, and embodiments of the present invention can be combined, and the combinations have synergistic functions and can exert synergistic effects.

Figure 1:
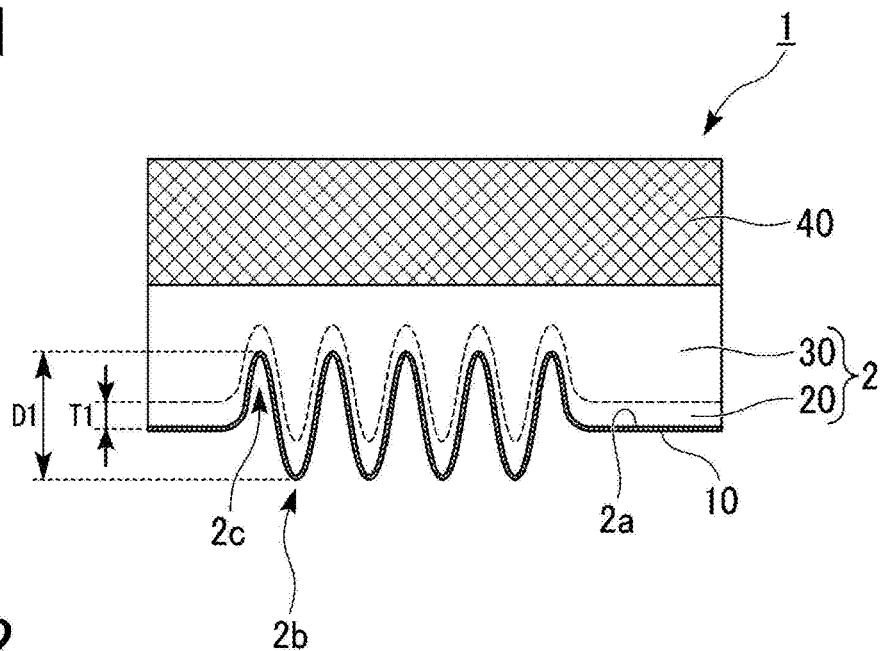
FIG. 1 is a schematic diagram illustrating a configuration of an optical structure according to a first embodiment of the present invention.

FIG. 1 is a schematic diagram illustrating a configuration of an optical structure 1 of the present embodiment. The optical structure 1 includes a reflection layer 10, a first resin layer 20 that is located on the reflection layer 10, a second resin layer 30 that is located on the first resin layer 20, and a carrier 40 that is located on the second resin layer 30. The first resin layer 20 and the second resin layer 30 constitute a multilayer relief 2 that has a first surface 2a having an uneven shape.

The reflection layer 10 is a translucent or concealing layer that reflects visible light, and allows optical effects of the multilayer relief 2 to be easily visually recognized. The reflection layer 10 may be made of metal. The metal may be a pure metal or an alloy. The reflection layer made of metal may be a concealing layer. The reflection layer 10 may be made of a metal compound. The reflection layer made of a metal compound may be a translucent layer. Examples of the material of the reflection layer 10 include aluminum, an aluminum alloy, zinc sulfide, and titanium dioxide. Aluminum and aluminum alloys are metals that are inexpensive and easily handled. Zinc sulfide is a metal compound that has a high refractive index to visible light and is easily processed. Titanium dioxide is a metal compound that has a high refractive index and is translucent.

The first resin layer 20 contains a non-radiation curable resin as a main component. The first resin layer 20 constitutes the first surface 2a of the multilayer relief. The first resin layer 20 has higher adhesion to the reflection layer 10 than the second resin layer 30 has. The first resin layer 20 is preferably made of a material that can form a thin film having a uniform thickness and is flexible enough to be able to follow the uneven shape of the optical relief of the multilayer relief. Examples of the material of the first resin layer 20 include an acrylic resin, a cellulose resin, a urethane resin, an epoxy resin, and a polyester resin. These resins may have a fluorine molecular structure or a silicone molecular structure.

The first resin layer 20 may contain, in addition to the non-radiation curable resin, an additive such as inorganic powder, a release agent, a leveling agent, polymer powder, or wax. The ratio of the non-radiation curable resin relative to the first resin layer 20 may be 90% or more in weight ratio. Examples of the inorganic powder include silica powder. Examples of the polymer powder include fluorine powder and silicone powder. Examples of the wax include polypropylene wax and polyethylene wax. Examples of the release agent include silicone, fluoropolymer, and aliphatic polymer. Examples of the leveling agent include silicone, fluoropolymer, and aliphatic polymer. These additives may have functions of both a release agent and a leveling agent. Alternatively, the wax may be used as a release agent or leveling agent.

Examples of the aliphatic polymer include those derived from ether esters, sulfuric ester salts, phosphate ester salts, amine salts, and carboxylates. The weight ratio of the additive may be 0.3% or more and 3% or less.

The first resin layer 20 may have a thickness of approximately 0.05 μm to 1 μm, depending on properties of the optical relief. The first resin layer 20 can be formed by coating. The first resin layer 20 may be formed by printing. The coating may be gravure coating or die coating. The printing may be gravure printing or silk-screen printing. The first resin layer 20 may cover the entire second resin layer 30.

The second resin layer 30 contains a radiation curable resin as a main component. The second resin layer 30 is adjacent to a surface of the first resin layer 20 facing away from the first surface 2a.

The radiation curable resin is a resin in which a polymerizable compound having a relatively low molecular weight is polymerized and cured (undergoes a reaction) by irradiation. The radiation used to cure the second resin layer 30 may be ultraviolet light (UV), visible light, gamma rays, X-rays, electron beams (EB), or the like, and is preferably ultraviolet light. When ultraviolet light is used as the radiation, a photopolymerization initiator, a polymerization inhibitor, and/or a photopolymerization accelerator may be added to control polymerization.

The polymerizable compound used as the material of the second resin layer 30 may be an epoxy acrylate or urethane acrylate having an unsaturated bond, or the like.

The second resin layer 30 may contain another resin as long as the second resin layer 30 contains the radiation curable resin as the main component.

The second resin layer 30 may have a thickness of approximately 1 μm to 10 μm, depending on properties of the optical relief. The second resin layer 30 can be formed by coating. The second resin layer 30 may be formed by printing or the like. The coating may be gravure coating or die coating. The printing may be gravure printing or silk-screen printing.

The first resin layer 20 may have an elastic modulus lower than that of the second resin layer 30. A precursor layer 30p (described later), which is the second resin layer 30 before curing, may have an elastic modulus lower than that of the second resin layer 30. In such a case, moldability tends to be higher. The elastic modulus may be a Young's modulus. The value of the elastic modulus may be a value obtained when the temperature of the resin is 200° C. The elastic modulus may be a condition for preventing deformation during heat and pressure lamination of the optical structure to a card.

The carrier 40 has transparency at least in the wavelength range of visible light and the wavelength range of radiation that cures the radiation curable resin which is the main component of the second resin layer 30. The carrier 40 may be a plastic film. Examples of the material of the plastic film include polyethylene terephthalate (PET), polyethylene naphthalate (PEN), and polypropylene (PP).

The multilayer relief 2 composed of the first resin layer 20 and the second resin layer 30 has a fine uneven shape on the surface on the reflection layer 10 side, and the uneven shape functions as the optical relief. The optical effects of the optical relief include an optical diffraction effect, a selective reflection effect or an antireflection effect, an isotropic or anisotropic scattering effect, a light condensing effect, and a polarization reflection effect. The optical relief exhibits effects such as an effect of preventing counterfeiting and tampering and an effect of improving the aesthetic appearance in visual observation, machine observation, or the like.

The optical relief can be formed by combining one or more unit reliefs having optical effects. The unit reliefs may be repeatedly arranged at intervals of 0.01 μm to 10 μm. The unit reliefs may be randomly arranged to form the optical relief.

In the multilayer relief 2, a distance (hereinafter referred to as an "unevenness difference") D1 in the thickness direction of the optical structure 1 between a most protruding portion 2b and a most recessed portion 2c on the first surface 2a may be larger than a thickness T1 of the first resin layer 20. The unevenness difference may be 0.03 μm or more and 5 μm or less.

The optical relief may include unit reliefs varying in unevenness difference. In the optical relief including the unit reliefs varying in unevenness difference, depending on the unevenness difference, different portions of the optical relief have different peelability from an embossing cylinder during molding; however, the difference in peelability can be mitigated by the first resin layer 20.

The reflection layer 10 can be formed to have a uniform thickness corresponding to the uneven shape of the multilayer relief 2.

An example of a procedure for producing the optical structure 1 of the present embodiment configured as described above will be described. This procedure includes a method of producing the optical structure according to the present embodiment.

Figure 2:
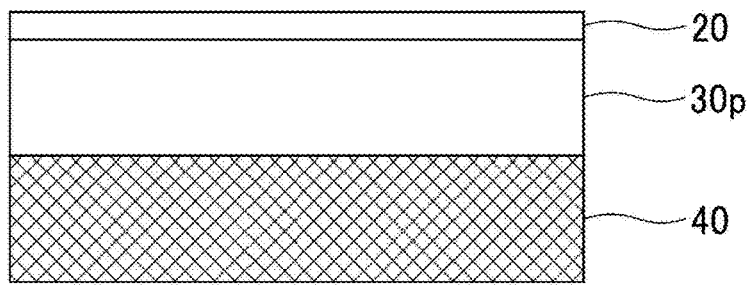
FIG. 2 is a diagram illustrating part of a production process of the optical structure.

First, as shown in FIG. 2, on the carrier 40, the precursor layer 30p, which is to be the second resin layer 30, and the first resin layer 20 are formed in this order (step A).

The polymerizable compound having a low molecular weight that constitutes the precursor layer 30p is generally easily dissolved in an organic solvent. Thus, when the first resin layer 20 is formed on the precursor layer 30p, in some cases, the precursor layer 30p is partially redissolved. Redissolution itself, which has advantages described later, is no particular problem; however, redissolution may cause clouding and the like, which may adversely affect curing of the precursor layer 30p or the optical effects of the optical structure 1.

Clouding and the like can be prevented by considering compatibility between the material of the precursor layer 30p and the material of the first resin layer 20. By selecting the material of the precursor layer 30p and the material of the first resin layer 20 so that both the materials contain any of a carboxyl group, an amino group, and a hydroxyl group, the materials have good compatibility with each other, and clouding and the like can be suitably prevented. The material of the first resin layer 20 may be a urethane resin, and the material of the precursor layer 30p may be a urethane (meth)acrylate.

Figure 3:
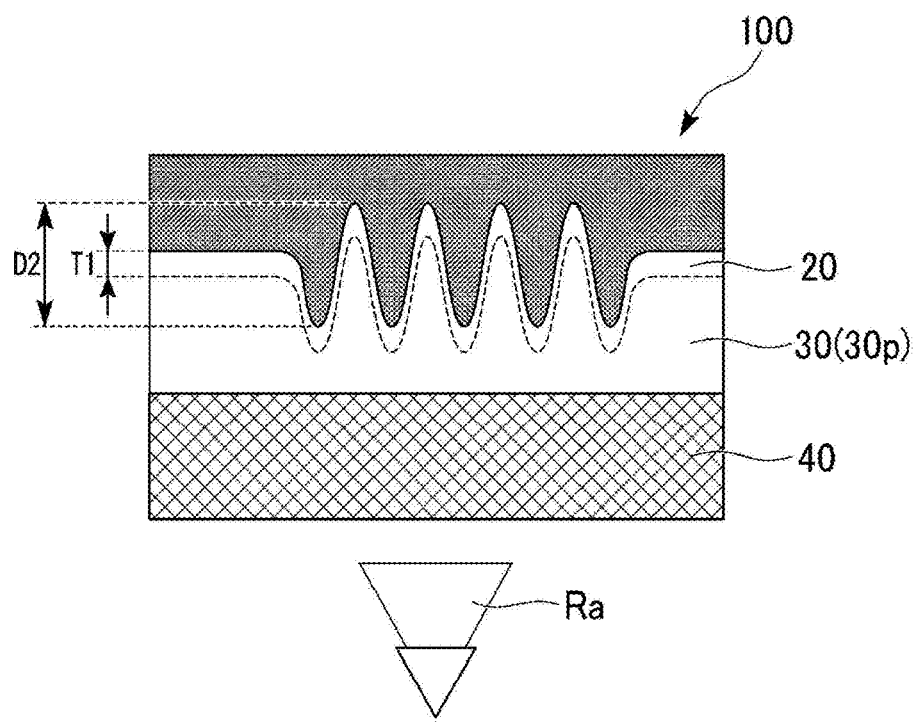
FIG. 3 is a diagram illustrating a process during production of the optical structure.
Figure 4:
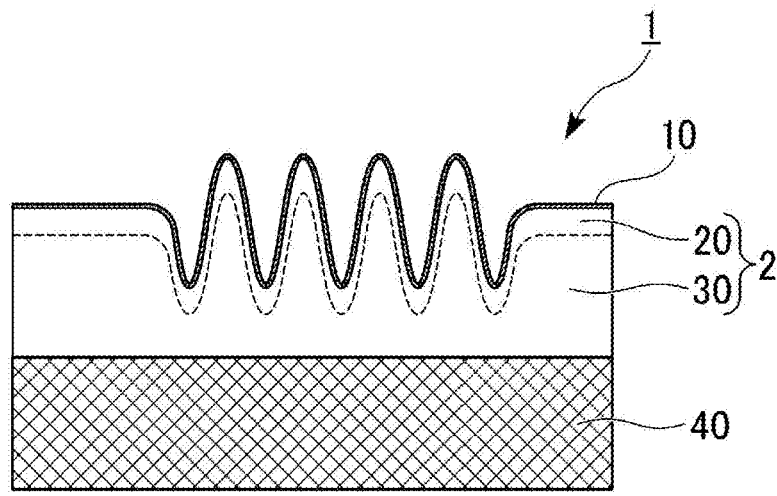
FIG. 4 is a diagram illustrating a process during production of the optical structure.

Next, as shown in FIG. 3, an embossing cylinder 100 having a surface shape corresponding to the shape of the optical relief is pressed against the first resin layer 20 to transfer the surface shape of the embossing cylinder 100 to the first resin layer 20 (step B). An unevenness difference D2 of the surface shape of the embossing cylinder 100 corresponds to an uneven shape of the multilayer relief 2 to be formed. The unevenness difference D2 may be larger than the thickness T1 of the first resin layer 20. Thus, the multilayer relief 2 may be configured such that the unevenness difference is not completely smoothed by the first resin layer 20 and the surface of the second resin layer 30 on the first resin layer 20 side is also deformed corresponding to the surface shape of the embossing cylinder 100.

The first resin layer 20 may have a uniform thickness. On the other hand, the second resin layer 30 has a thickness varying according to the surface shape of the second resin layer 30. The standard deviation of the thickness of the first resin layer 20 may be within 30% of the average thickness. The difference in the thickness of the second resin layer 30 may be 80% or more and less than 100% of the unevenness difference D2. The thickness of each of the resin layers may be obtained by extracting ten measurement points from a cross section and averaging values of the thickness at the measurement points.

By pressing the appropriately heated embossing cylinder 100 against the first resin layer 20, the surface shape can be transferred while the first resin layer 20 and the precursor layer 30p are softened, thus enabling an optical relief to be accurately formed. The processing conditions in the step B may be, for example, 50 to 200° C. and 1 to 50 Kgf/cm².

While the embossing cylinder 100 is pressed against the first resin layer 20, the precursor layer 30p is irradiated with adequate radiation Ra from the carrier 40 side (step C). The radiation is transmitted through the carrier 40 and reaches the precursor layer 30p. By radiation exposure, the precursor layer 30p is cured to be the second resin layer 30.

Step B and step C may be sequentially performed, or may be simultaneously performed. When step C is performed after step B, the embossing cylinder 100 may be separated from the first resin layer 20; however, an optical relief is easily formed with high accuracy while the embossing cylinder 100 is in contact with the first resin layer 20 at a constant pressure.

Next, a reflection layer is formed on the first resin layer 20 by vacuum deposition, sputtering, or the like (step D). As a pretreatment for formation of the reflection layer, the first resin layer 20 may be subjected to surface treatment. Examples of the surface treatment include corona treatment and plasma treatment.

Through the above steps, the optical structure 1 of the present embodiment is completed.

In the optical structure 1 of the present embodiment, the multilayer relief 2 includes the first resin layer 20 containing the non-radiation curable resin as the main component and the second resin layer 30 containing the radiation curable resin as the main component, and the first resin layer 20 is in contact with the reflection layer 10. Since the first resin layer 20 having higher adhesion to the reflection layer 10 than the second resin layer 30 is in contact with the reflection layer 10, adhesion between the multilayer relief and the reflection layer is high as compared with a typical configuration produced by the photopolymerization method in which a multilayer relief is composed of only a radiation curable resin layer.

The second resin layer 30 is not in direct contact with the reflection layer 10, and the first resin layer 20, which is not radiation-curable, is provided between the second resin layer 30 and the reflection layer 10. Thus, even when volume contraction occurs during curing of the precursor layer 30p, the volume contraction does not directly affect an interface between the first resin layer 20 and the reflection layer 10. As a result, distortion is less likely to occur at the interface between the multilayer relief and the reflection layer, and this makes it possible to easily prevent bonding failure due to distortion. Furthermore, bonding failure due to distortion can be prevented even when the reflection layer is made of a metal compound, although the metal compound has low elasticity and distortion of the metal compound tends to cause bonding failure.

When the thickness of the first resin layer 20 is smaller than the unevenness difference of the multilayer relief 2, in step B, the second resin layer 30 is always deformed according to the uneven shape of the embossing cylinder 100, and in step C, the second resin layer 30 is cured while being deformed. As a result, the first resin layer 20 is supported by the second resin layer 30 having a shape corresponding to the uneven shape of the multilayer relief 2, and the first resin layer strongly affects molding accuracy of the multilayer relief.

This allows the multilayer relief 2 to achieve high molding accuracy even though the outermost surface of the multilayer relief 2 is the first resin layer 20 containing, as the main component, the non-radiation curable resin having lower molding accuracy than the radiation curable resin. This effect is more pronounced when the second resin layer 30 has a thickness larger than that of the first resin layer 20.

In addition, when the second resin layer 30 has a melting point higher than that of the first resin layer 20, even if the produced optical structure 1 is exposed to a temperature greater than or equal to the melting point of the main component of the first resin layer 20, the uneven shape of the multilayer relief 2 is easily maintained by the second resin layer 30. Thus, the multilayer relief 2 of the optical structure 1 can have higher heat resistance.

The material of the second resin layer 30 may not necessarily have a clear melting point. In this case, the uneven shape of the multilayer relief 2 is also easily maintained by the second resin layer 30.

Since in the step C, the precursor layer 30p is covered with the first resin layer 20 and is not exposed to air, polymerization inhibition due to oxygen in the air is less likely to occur during the curing reaction of the precursor layer.

In the optical structure 1 of the present embodiment, in some cases, when in the step A, the precursor layer 30p is redissolved, the resin material of the precursor layer 30p and the resin material of the first resin layer 20 are mixed at a boundary portion between the precursor layer 30p and the first resin layer 20, eliminating a clear interface between the precursor layer 30p and the first resin layer 20. When the precursor layer 30p in this state is cured in the step C, the first resin layer 20 and the second resin layer 30 are integrated to form a structure in which interlayer peeling is less likely to occur. That is, a thin mixed layer or mixed region is formed between the first resin layer 20 and the second resin layer 30. As a result, in addition to adhesion between the multilayer relief and the reflection layer, adhesion between the layers in the multilayer relief can be improved, thus reducing unnecessary reflected light generated at the interface between the first resin layer and the second resin layer.

When a mixed layer or a mixed region is present between the first resin layer 20 and the second resin layer 30, dyeing or the like is performed to identify a region in which the resin of the first resin layer is mixed with the resin of the second resin layer, and an intermediate portion of the region in the thickness direction is defined as the boundary between the first resin layer 20 and the second resin layer 30.

A second embodiment of the present invention will be described with reference to FIGS. 5 to 7. In the following description, components that are common to those described above are denoted by the same reference signs, and duplicated description thereof will be omitted.

Figure 5:
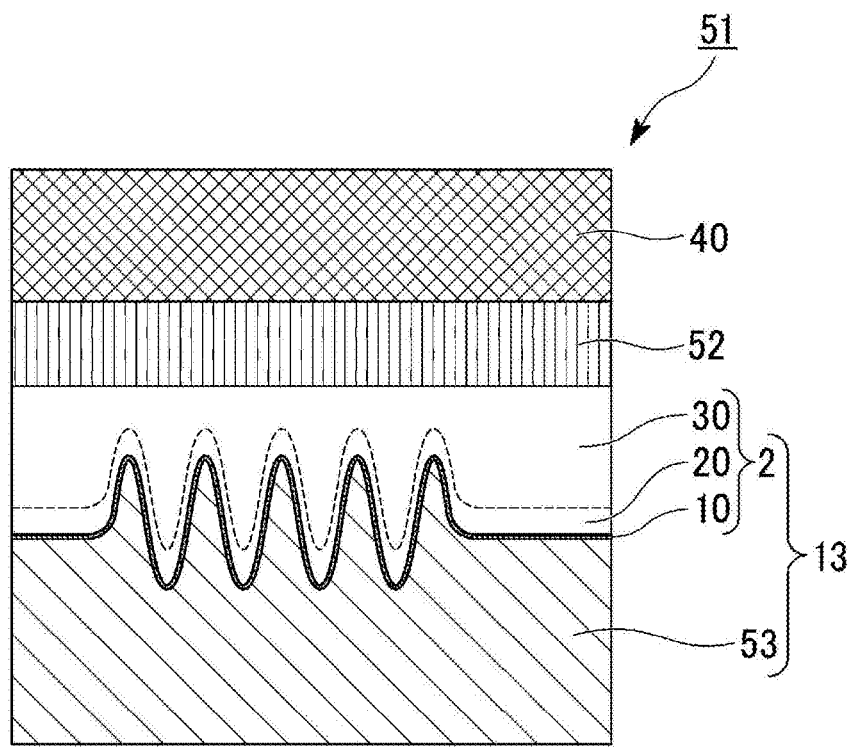
FIG. 5 is a schematic diagram illustrating a configuration of a transfer foil according to a second embodiment of the present invention.

FIG. 5 is a schematic diagram illustrating a configuration of a transfer foil 51 according to the present embodiment. The transfer foil 51 includes the optical structure 1, and further includes a release layer 52 and an adhesive layer 53.

The release layer 52 is a layer provided between the carrier 40 and the second resin layer 30. The release layer 52 reduces interlayer adhesive strength at the interface between the carrier 40 and the second resin layer 30 to allow the carrier 40 to be easily peeled off from the optical structure 1.

The release layer 52 may be a mixture of a resin and a lubricant. The resin may be a thermoplastic resin. Examples of the thermoplastic resin include an acrylic resin, a polyester resin, and a cellulose resin. The lubricant may be polyethylene powder, silicone, or wax such as carnauba wax.

The release layer 52 may have a thickness of 0.01 μm or more and 2 μm or less.

The adhesive layer 53 is a layer provided on the reflection layer 10. The adhesive layer 53 enables the optical structure 1 to be attachable to another medium. The adhesive layer 53 may be configured to constantly exhibit adhesiveness and be covered with a separator or the like. Alternatively, the adhesive layer 53 may be configured to exhibit no adhesiveness at room temperature and exhibit adhesiveness due to an external factor such as heat, light, or pressure.

The adhesive layer 53 may be made of a thermoplastic resin. Examples of the thermoplastic resin include a modified acrylic resin, a polyester resin, an epoxy resin, and a urethane resin. The adhesive layer 53 may partially contain an elastomer material. The elastomer may be made of a block copolymer or mixture of a styrene material, a vinyl chloride material, an olefin material, and a urethane material.

By bonding the adhesive layer 53 of the transfer foil 51 of the present embodiment configured as described above to an object and peeling off the carrier 40, the optical structure 1 can function as an element for confirming authenticity of the object.

Figure 6:
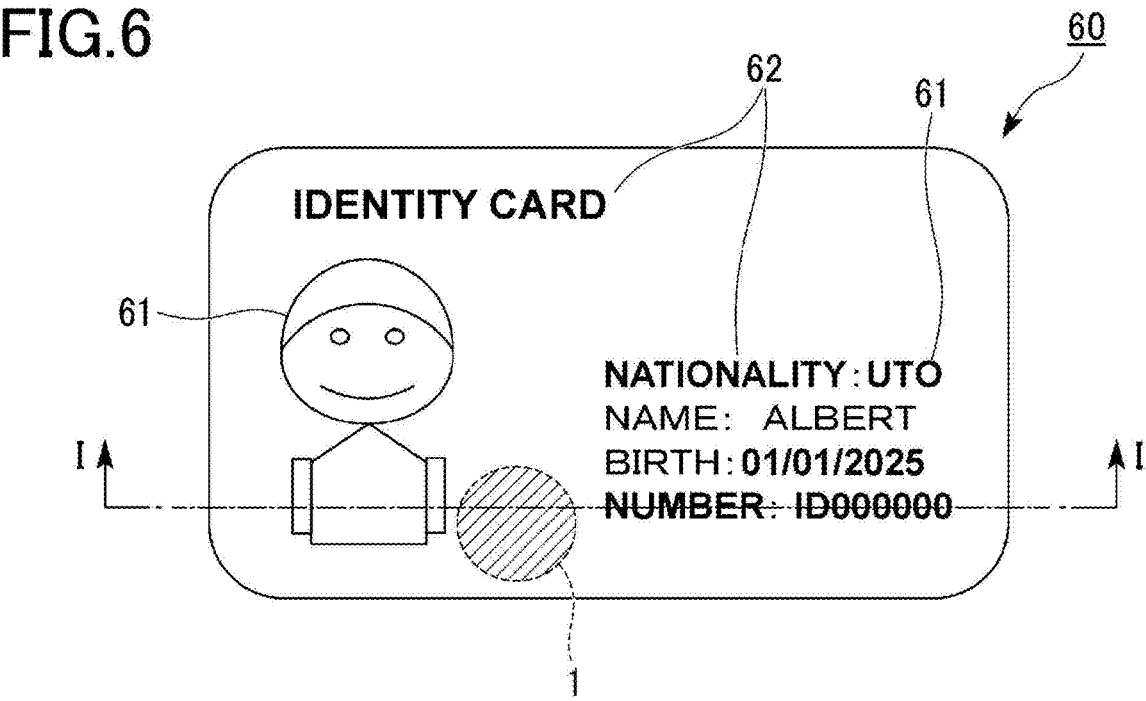
FIG. 6 is a schematic diagram illustrating an example of an article including the optical structure.
Figure 7:
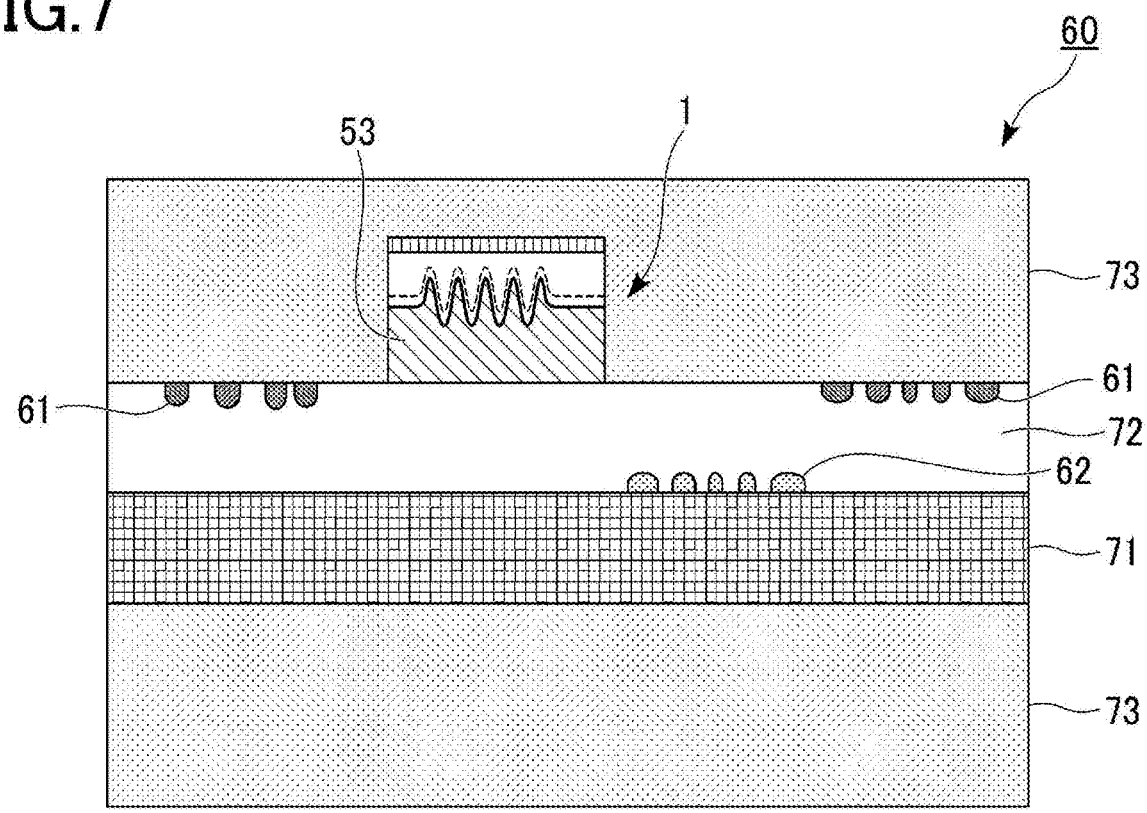
FIG. 7 is a schematic diagram illustrating a cross-sectional structure taken along line I-I of FIG. 6.

FIGS. 6 and 7 show an example of an application of the transfer foil 51.

FIG. 6 shows a card 60 as an example of an article including the optical structure 1. FIG. 7 is a cross-sectional view taken along line I-I of FIG. 6.

The card 60 may be an identification document. The optical structure 1 of the card 60 enables verification of whether the card is authentic. The card 60 includes, in addition to the optical structure 1, laser print 61 and printing unit 62 that can be visually confirmed.

As shown in FIG. 7, the card 60 includes a first sheet 71, a second sheet 72, two laminate materials 73 that sandwich the first sheet 71 and the second sheet 72. The printing unit 62 is formed on the first sheet 71. The laser print 61 is formed on the second sheet 72, and the optical structure 1 is bonded to the second sheet 72 via the adhesive layer 53. When the first sheet 71 and the second sheet 72 stacked together are sandwiched between the laminate materials 73 on both sides in the thickness direction and subjected to heat-pressure lamination, the card 60 can be produced in which the first sheet 71, the second sheet 72, and the laminate materials 73 are integrated. The optical structure is embedded inside the card 60.

By bonding the adhesive layer 53 of the transfer foil 51 to the second sheet 72 and peeling off the carrier 40, the optical structure 1 can be attached to the second sheet 72.

In the optical structure 1, the second resin layer 30 after curing has low thermal deformability. The first resin layer 20 has low elasticity and is hard; thus, the second resin layer 30 that maintains the uneven shape is less likely to be affected by the heat-pressure lamination and even when deformation of the second resin layer 30 is attempted, such deformation is prevented by the first resin layer 20. This makes it possible to form the card 60 in which the surface shape of the multilayer relief is suitably maintained.

The first sheet 71, the second sheet 72, and the laminate material 73 may be a plastic film having transparency. The undersurface of the first sheet 71 and the laminate material 73 on the lower side may be configured to have concealing properties by printing on the entire surface or the like.

Examples of the material of the plastic film include PET, PEN, PP, polyvinyl chloride (PVC), glycol-modified PET (PET-G), and polycarbonate (PC). Among these, plastic films made of any of PVC, PET-G, and PC are generally used as laminate materials of various cards or laminate materials of passports. These plastic films are preferable in terms of easy integration processing using heat or pressure.

Each of the first sheet 71, the second sheet 72, and the laminate material 73 preferably has a thickness of 50 μm or more and 500 μm or less, and more preferably 75 μm or more and 400 μm or less. When the thickness is 50 μm or more, sufficient physical strength and easy handling are achieved. When the thickness is 500 μm or less, thickness variation or bending is less likely to affect production of an article.

The printing unit 62 is provided in the desired color on the entire surface or in a pattern such as characters and designs, in order to add information to be provided.

The printing unit 62 can be formed by using ink. The ink may be an offset ink, a letterpress ink, a gravure ink, or the like, depending on the printing method. Alternatively, the ink may be a resin ink, an oil-based ink, a water-based ink, or the like, depending on the difference in composition. Furthermore, the ink may be an oxidative polymerization type ink, a penetration drying type ink, an evaporation drying type ink, an ultraviolet curable ink, or the like, depending on the difference in drying method. The ink may be a functional ink whose color changes according to a light illumination angle or an observation angle. The functional ink may be an optically variable ink, a color-shifting ink, a pearl ink, or the like.

The printing unit 62 can also be formed by electrophotography using toner. The printing unit 62 can be formed by preparing toner in which color particles of graphite, a pigment, or the like are adhered to plastic particles having electrostatic properties, then using static electricity to transfer the toner to an object on which the printing unit 62 is to be printed, and fixing the toner by heating.

An article to which the optical structure 1 is attached is not limited to the identification document such as the card 60. The optical structure 1 may be attached to articles such as valuables having a high brand value or tags to be attached to the valuables, allowing the optical structure 1 to function as an element for confirming authenticity of the valuables.

Experimental evidence of the optical structure of the present invention will be described with reference to the following experiments and comparative experiments. In the following description, the term "part(s)" refers to "part(s) by mass" unless otherwise specified.

Preparation of Optical Structure According to Experimental Example 1

As a carrier, a PET film having a thickness of 25 μm (Lumirror 25T60 manufactured by Toray Industries, Inc.) was used. The carrier was coated with a precursor layer ink with a thickness of 2 μm by gravure printing, and an organic solvent was volatilized and removed to form a precursor layer. Furthermore, the precursor layer was coated with a first resin layer ink with a thickness of 0.1 μm by gravure printing, and an organic solvent was volatilized and removed to form a first resin layer.

A cylindrical metal embossing cylinder having an uneven pattern with an unevenness difference of 0.3 μm and intervals of 2 μm was pressed against the first resin layer under the conditions of a pressure of 2 Kgf/cm$^2$, a temperature of 160° C., and a speed of 10 m/min to transfer the uneven shape to the first resin layer and the precursor layer. Then, the precursor layer was exposed to ultraviolet light at 300 mJ/cm$^2$ using a high-pressure mercury lamp and the like to be cured to form a second resin layer.

Finally, on the first resin layer, a reflection layer 10 made of zinc sulfide (ZnS) and having a thickness of 60 nm was formed by vacuum deposition. Thus, an optical structure was prepared.

The composition of the precursor layer ink and the first resin layer ink used in Experimental Example 1 is shown below.

| (Precursor layer ink) | |
|---|---|
| Urethane (meth)acrylate (polyfunctional, molecular weight 20,000, nv = 30%) | 100 parts |
| Methyl ethyl ketone | 60 parts |
| Ethyl acetate | 40 parts |
| Photoinitiator (Irgacure 184 manufactured by Chiba Specialty Chemicals Inc.) | 3 parts |
| (First resin layer ink) | |
| Urethane resin (softening point 140° C.) | 5 parts |
| Methyl ethyl ketone | 35 parts |
| Ethyl acetate | 60 parts |

Preparation of Optical Structure According to Experimental Example 2

Experimental Example 2 is an example of a configuration in which a first resin layer contains an additive.

As a carrier, a PET film having a thickness of 25 μm (Lumirror 25T60) was used. The carrier was coated with a precursor layer ink with a thickness of 2 μm by gravure printing, and an organic solvent was volatilized and removed to form a precursor layer. Furthermore, the precursor layer was coated with a first resin layer ink with a thickness of 0.1 μm by gravure printing, and an organic solvent was volatilized and removed to form a first resin layer.

A cylindrical metal embossing cylinder having an uneven pattern with an unevenness difference of 0.3 μm and intervals of 2 μm was pressed against the first resin layer under the conditions of a pressure of 2 Kgf/cm$^2$, a temperature of 160° C., and a speed of 10 m/min to transfer the uneven shape to the first resin layer and the precursor layer. Then, the precursor layer was exposed to ultraviolet light at 300 mJ/cm$^2$ using a high-pressure mercury lamp and the like to be cured to form a second resin layer.

Next, as pretreatment for formation of a reflection layer, the first resin layer was subjected to corona treatment. The corona treatment was performed under the conditions of a speed 5 m/min, an output of 0.2 kW, and a discharge distance of 2 mm.

Finally, on the first resin layer, a reflection layer 10 made of ZnS and having a thickness of 60 nm was formed by vacuum deposition. Thus, an optical structure was prepared.

The composition of the precursor layer ink and the first resin layer ink used in Experimental Example 2 is shown below.

| (Precursor layer ink) | |
|---|---|
| Urethane (meth)acrylate (polyfunctional, molecular weight 20,000, nv = 30%) | 100 parts |
| Methyl ethyl ketone | 60 parts |
| Ethyl acetate | 40 parts |
| Photoinitiator (Irgacure 184) | 3 parts |
| (First resin layer ink) | |
| Urethane resin (softening point 140° C.) | 5 parts |
| Phosphate ester salt | 0.05 parts |
| Methyl ethyl ketone | 35 parts |
| Ethyl acetate | 60 parts |

Comparative Experiment 1

An optical structure of Comparative Experiment 1 was prepared by the same procedure as in Experimental Example 1 except that no first resin layer was provided and the reflection layer was formed on the second resin layer.

Comparative Experiment 2

An optical structure of Comparative Experiment 2 was prepared by the same procedure as in Experimental Example 1 except that the first resin layer had a thickness of 1 μm. In Comparative Experiment 2, the thickness of the first resin layer was 3 times or more the unevenness difference of the uneven shape of the multilayer relief.

Comparative Experiment 3

An optical structure of Comparative Experiment 3 was prepared by the same procedure as in Experimental Example 1 except that no second resin layer was provided and the first resin layer had a thickness of 2.1 μm. Since no second resin layer was provided, no ultraviolet exposure was performed.

The optical structures of the respective examples were evaluated for the following items.

(Molding Accuracy)

Molding accuracy was evaluated according to the degree of agreement between the uneven shape of the embossing cylinder and the uneven shape of the multilayer relief. The uneven shape of the embossing cylinder and the uneven shape of the multilayer relief can be measured by observation using various microscopes.

First, for the uneven shape of the embossing cylinder in a predetermined region and the uneven shape of the multilayer relief in the corresponding region, the unevenness difference and the unevenness interval were measured. Next, for each of the unevenness difference and the unevenness interval, the measurement value for the multilayer relief was divided by the measurement value for the embossing cylinder to calculate the degree of agreement (%), and the degree of agreement was evaluated by the following criteria.

Good: Degree of agreement was 90% or more.

Poor: Degree of agreement was less than 90%.

(Adhesion Between Multilayer Relief and Reflection Layer)

A tape was adhered to the reflection layer of the examples, and the presence or absence of peeling was determined in accordance with JISH8504 "Methods of adhesion test for metallic coatings".

Good: No reflection layer adhered to the removed tape.

Poor: Reflection layer adhered to the removed tape.

(Heat Resistance)

The optical structures of the respective examples were left in an environment of 200° C. and a flat pressing pressure of 200 N/cm$^2$ for 20 minutes. Then, it was visually evaluated on the following two-level scale whether the optical effects of the multilayer relief were maintained.

Good: Optical effects were unchanged.

Poor: Optical effects were lost.

The results are shown in Table 1.

TABLE 1

| | Experimental Example 1 | Experimental Example 2 | Comparative Experiment 1 | Comparative Experiment 2 | Comparative Experiment 3 |
|---|---|---|---|---|---|
| Second resin layer thickness (μm) | 2.0 | 2.0 | 2.0 | 2.0 | — |
| First resin layer thickness (μm) | 0.1 | 0.1 | — | 1.0 | 2.1 |
| Unevenness difference (μm) | 0.3 | 0.3 | 0.3 | 0.3 | 0.3 |
| Molding accuracy | Good | Good | Good | Poor | Poor |
| Adhesion | Good | Good | Poor | Good | Good |
| Heat resistance | Good | Good | Good | Poor | Poor |

The optical structures of the respective examples were good in both molding accuracy of the uneven shape of the multilayer relief and adhesion between the multilayer relief and the reflection layer. Furthermore, under the high-temperature and high-pressure environment, the optical effects of the multilayer relief were maintained, and sufficient heat resistance was exhibited. The results of Experimental Example 2 showed that in particular, during embossing cylinder processing, good antifouling properties were exhibited, and the amount of first resin layer material adhered to the surface of the cylinder after processing was extremely small.

In Comparative Experiment 1, adhesion between the multilayer relief and the reflection layer was low. This was presumably because no first resin layer was provided.

In Comparative Experiment 2, molding accuracy and heat resistance were insufficient. This was presumably because the first resin layer having an excessively large thickness prevented the second resin layer from sufficiently functioning.

In Comparative Experiment 3, molding accuracy and heat resistance were insufficient. This was presumably because no second resin layer was provided.

Figure 8:
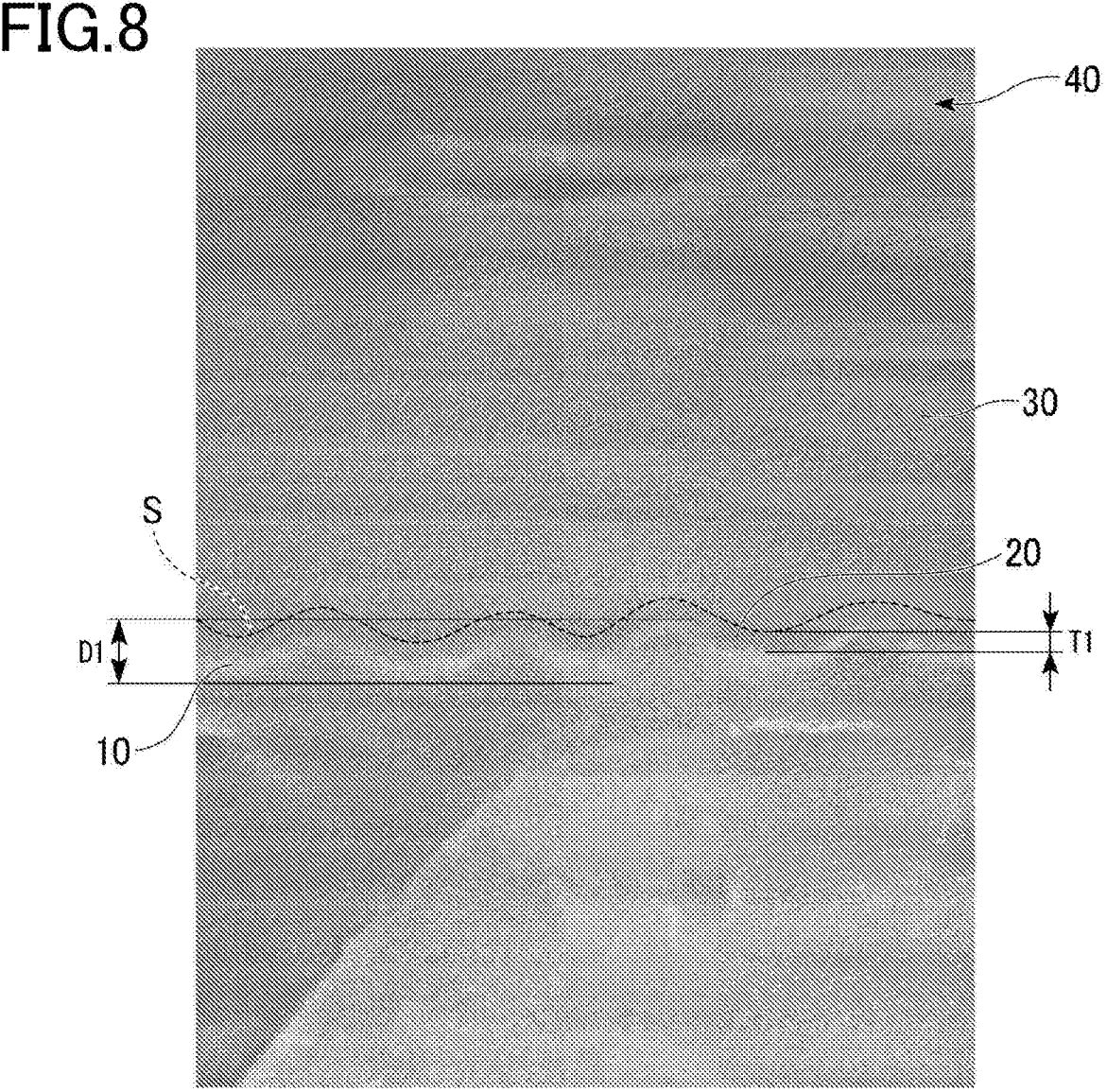
FIG. 8 is a cross-sectional image of an optical structure of an experimental example obtained by using a scanning electron microscope.

FIG. 8 shows a cross-sectional image of Experimental Example 1 obtained by using a scanning electron microscope (SEM). The image shows that as a result of the unevenness difference D1 of the surface shape of the multilayer relief 2 being larger than the thickness T1 of the first resin layer 20, the second resin layer 30 was cured in a state in which unevenness was formed on the surface of the second resin layer 30 on the first resin layer 20 side (indicated by broken line S).

Although the embodiments and the experimental examples of the present invention have been described in detail with reference to the drawings, the specific configuration is not limited to the embodiments. The present invention includes modifications and combinations of the configurations within the scope not departing from the gist of the present invention.

The terms "part", "element", "pixel", "cell", "segment", "unit", "display", and "article" used in the present disclosure represent physical entities. A physical entity can refer to a physical form or a spatial form surrounded by material. The physical entity may be a structure. The structure may have specific functions. A combination of structures having specific functions can exert synergistic effects by combining the functions of the structures.

The terms used in the present disclosure and particularly in the appended claims (e.g., bodies of the appended claims) are generally intended as "open" terms (e.g., the term "having" should be interpreted as "having at least", and the term "including" should be interpreted as "including but not limited to", or the like).

Various embodiments of the present invention are described herein with reference to the related drawings. Alternative embodiments can be devised without departing from the scope of the present invention. Various connections and positional relationships (e.g., over, below, adjacent, or the like) are presented between elements in the description and in the drawings. These connections and/or positional relationships, unless specified otherwise, can be direct or indirect, and the present invention is not intended to be limiting in this respect. Accordingly, a coupling of entities can refer to either a direct or indirect coupling. A positional relationship between entities can be a direct or indirect positional relationship. As an example of an indirect positional relationship, references herein to forming layer "A" over layer "B" include situations in which one or more intermediate layers (e.g., layer "C") are between layer "A" and layer "B". The intermediate layer(s) are between layer "A" and layer "B" as long as the relevant characteristics and functionalities of layer "A" and layer "B" are not substantially changed by the intermediate layer(s).

The following definitions and abbreviations are to be used for the interpretation of the claims and the specification. As used herein, with regard to the terms "comprises", "comprising", "includes", "including", "has", "having", "contains", "containing", or any other variation thereof, for example, a composition, mixture, process, method, article, or apparatus that includes a list of elements is not necessarily limited to only those elements but can include other elements not expressly listed or inherent to such composition, mixture, process, method, article, or apparatus. Additionally, the term "exemplary" is used herein to mean "serving as an example, instance, or illustration".

Any embodiment or design described herein as "exemplary" is not necessarily to be construed as preferred or advantageous over other embodiments or designs. The terms "at least one" and "one or more" are understood to include any integer number greater than or equal to one, i.e., one, two, three, four, etc. The term "a plurality" is understood to include any integer number greater than or equal to two. The term "connection" can include an indirect "connection" and a direct "connection". References herein to "one embodiment", "an embodiment", "an exemplary embodiment", or the like, indicate that the embodiment described can include a particular feature, structure, or characteristic, but every embodiment may or may not include the particular feature, structure, or characteristic. The feature, structure, or characteristic, and such phrases do not necessarily refer to the same embodiment. Further, when a particular feature, structure, or characteristic is described in connection with an embodiment, if it is within the knowledge of those skilled in the art whether such feature, structure, or characteristic is affected in connection with other embodiments, it may not be explicitly described.

For purposes of description, the terms "upper", "lower", "right", "left", "vertical", "horizontal", "top", "bottom", and derivatives thereof shall relate to the described structures. These terms and derivatives thereof shall also relate to the methods shown in the drawing figures. The terms "overlying", "atop", "on top", "positioned on", or "positioned atop" mean that a first element, such as a first structure, is present on a second element, such as a second structure. Intervening elements such as an interface structure can be present between the first element and the second element. The terms "about", "substantially", "approximately", and variations thereof are intended to include the degree of error associated with measurement of the particular quantity based upon the equipment available at the time of filing the application. For example, "about" can include a range of ±8%, ±5%, or ±2% of a given value. As used herein, the term "about" modifying the quantity of an ingredient, component, or reactant of the invention employed refers to variation in the numerical value that can occur, for example, through typical measuring and liquid handling procedures used for making concentrates. Furthermore, variation can occur from inadvertent error in measuring procedures, differences in the manufacture, source, or purity of the ingredients employed to make the compositions or carry out the methods, and the like. In one aspect, the term "about" means within 10% of the stated numerical value. In another aspect, the term "about" means within 5% of the stated numerical value. Yet, in another aspect, the term "about" means within 10, 9, 8, 7, 6, 5, 4, 3, 2, or 1% of the stated numerical value. It will also be understood that when an element such as a layer or region is referred to as being "on" or "over" another element, it can be directly on the other element or intervening elements may also be present. In contrast, when an element is referred to as being "directly on" or "directly over" another element, there are no intervening elements present. The descriptions of the various embodiments of the present invention have been presented for purposes of illustration, but are not intended to be exhaustive or limited to the embodiments disclosed. Many modifications and variations will be apparent to those skilled in the art without departing from the scope and spirit of the described embodiments. The terms used herein have been chosen to best explain the principles of the embodiments, the practical application or technical improvement over technologies found in the marketplace, or to enable those skilled in the art to understand the embodiments described herein.

The terms, configurations, features, aspects, and embodiments should be interpreted with reference to the drawings as necessary. Matters that can be directly and unambiguously derived from the drawings should be a basis for amendment as with the text.

If a specific number of an introduced claim recitation is intended, such an intent will be explicitly recited in the claim, and in the absence of such recitation, no such intent is present. For example, for the sake of clarity, the appended claims may use introductory phrases such as "at least one" or "one or more" to introduce claim recitations. However, the use of such phrases should not be construed to imply that the introduction of a claim recitation by the indefinite articles "a" or "an" limits any particular claim containing such claim recitation to embodiments containing only one such recitation. The introductory phrases "one or more" or "at least one" and the indefinite articles such as "a" or "an" (e.g., "a" and/or "an") should be interpreted to mean at least "at least". That is, "one" or "one or more"). The same holds true for the use of definite articles used to introduce claim recitations.

REFERENCE SIGNS LIST

1 . . . Optical structure; 2 . . . Multilayer relief; 2a . . . First surface; 10 . . . Reflection layer; 20 . . . First resin layer; 30 . . . Second resin layer; 30p . . . Precursor layer; 40 . . . Carrier; 51 . . . Transfer foil; 60 . . . Card (article, identification document); 100 . . . Embossing cylinder; D1 . . . Unevenness difference (of multilayer relief); D2 . . . Unevenness difference (of surface shape of embossing cylinder); T1 . . . Thickness (of first resin layer).

What is claimed is:

1. A method of producing an optical structure, comprising the steps of:
   a step A of forming, in this order, on a carrier, a precursor layer made of a radiation curable resin, and a first resin layer containing a non-radiation curable resin as a main component;
   a step B of pressing, against the first resin layer, an embossing cylinder that has a surface shape having an unevenness difference larger than a thickness of the first resin layer, and transferring the surface shape to the first resin layer and the precursor layer;
   a step C of curing the precursor layer by radiation exposure to form a second resin layer; and
   a step D of forming a reflection layer on the first resin layer.

* * * * *